Aug. 7, 1945.   M. J. HABERKORN   2,381,279
FISH LURE
Filed Aug. 6, 1943

Inventor
Matthew J. Haberkorn

Patented Aug. 7, 1945

2,381,279

UNITED STATES PATENT OFFICE 2,381,279

FISH LURE

Matthew J. Haberkorn, Oak Park, Ill.

Application August 6, 1943, Serial No. 497,575

8 Claims. (Cl. 43—36)

My invention relates to fish lures.

One of the objects of my invention is to provide a fish lure in which the hook means are normally housed between two hinged sections of the body and which are automatically ejected into operative position when the fish strikes at the bait.

A further object is to provide such a construction which will be easy to set and reliable in operation.

Further objects and advantages of the invention will be apparent from the description and claims.

In the drawing, in which an embodiment of my invention is shown,

Figure 3:
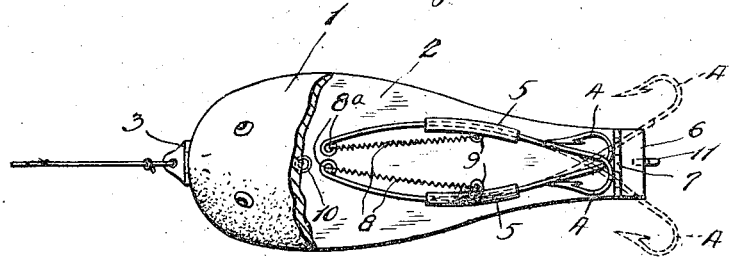
Fig. 3 is a plan view, with the upper half shell broken away to expose the hooks.
Figure 5:
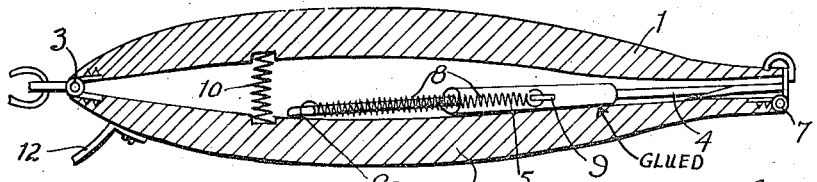
Fig. 5 is a section on the line 5—5 of Fig. 2.

Referring to the drawing in detail, the construction shown comprises a fish lure having a body portion, including two half shells 1 and 2, hinged together at their front ends at 3, a pair of hooks 4 having curved shanks slidably mounted in curved guide tubes or sleeves 5 secured to the lower shell 2 in any suitable known manner as by gluing and housed between said half shells 1 and 2 before the fish strikes at the bait, a retainer latch 6 hinged to the lower half shell 2 at 7 for engaging and retaining the hooks 4 in housed position, a pair of coil tension springs 8 secured to the hooks at 8ª and to the guide sleeves 5 at 9 for urging the hooks 4 to the extended dotted-line position shown in Fig. 3, and a coil compression spring 10 urging the two half shells to spread apart to hold the retainer latch in latched position until the fish strikes. For holding the latch retainer in latched position, a hook 11 is provided at the upper end of the hinged latch 6 which engages a depression in the upper half shell.

Figure 1:
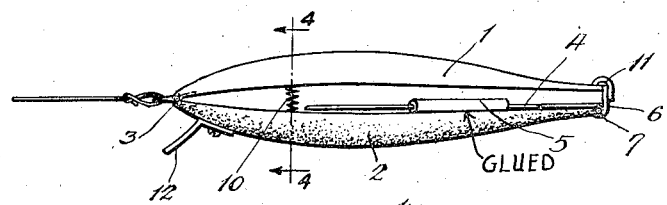
Figure 1 is a side elevational view of the lure, with the hooks in housed position.
Figure 2:
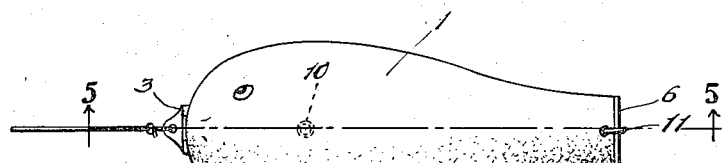
Fig. 2 is a plan view of the construction shown in Fig. 1.
Figure 4:
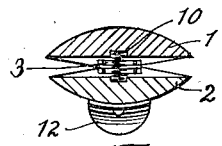
Fig. 4 is a section on the line 4—4 of Fig. 1.

In use, when a fish strikes at the bait and closes its jaws on it, it will tend to move the two half shells 1 and 2 toward each other, thus releasing the retainer latch 6 which moves to the nonretaining position shown in Fig. 3. The coil tension springs 8 will then eject the hooks to the dotted-line position shown in Fig. 3, thus insuring that the fish will be hooked. To reset the lure, the hooks are pushed back to the full-line position shown in Fig. 3, the hinged retainer is moved from the position shown in Fig. 3 to the position shown in Figs. 1 and 2, in which it engages the bends in the hooks, and the two half shells are alowed to spread apart to cause the upper half shell 1 to engage the hook 11 on the retainer latch to hold the latch in hook-retaining position. The curved guide sleeves 5 co-operating with the curved shanks of the hooks 4 prevent any twisting of the shanks in the guides. The lure may, if desired, be provided with a suitable inclined plate 12 to give the desired motion and action to the lure as it is drawn through the water.

Further modifications will be apparent to those skilled in the art and it is desired, therefore, that the invention be limited only by the scope of the appended claims.

Having thus described my invention, what I claim and desire to secure by Letters Patent is:

1. A fish lure comprising a body portion including two half shells pivoted together adjacent their front ends, and hook means comprising a hook movably mounted on one of said half shells and lying between said half shells substantially in a horizontal plane and biased toward ejection from between said half shells by movement in a substantially horizontal plane, and retaining latch means released by the relative movement of said half shells, said means holding the hook in housed position when latched and enabling the hook to be ejected when unlatched.

2. A fish lure comprising a body portion including two half shells pivoted together adjacent their front ends, and a pair of hooks movably mounted on one of said half shells and lying between said half shells substantially in a horizontal plane and biased toward ejection from between said half shells by movement in a substantially horizontal plane, and retaining latch means released by the relative movement of said half shells, said means holding the hooks in housed position when latched and enabling the hooks to be ejected when unlatched.

3. A fish lure comprising a body portion including two half shells pivoted together adjacent their front ends, and a pair of hooks movably mounted on one of said half shells and lying between said half shells substantially in a horizontal plane and biased toward ejection from between said half shells by movement in a substantially horizontal plane, and retaining latch means released by the relative movement of said half shells, said means holding the hooks in housed position when latched and enabling the hooks to be ejected when unlatched, said hooks lying in a general plane between said half shells.

4. A fish lure comprising a body portion including two half shells pivoted together adjacent their front ends, and hook means comprising a hook slidably mounted on one of said half shells and biased toward ejection from between said half shells, retaining latch means released by the relative movement of said half shells, said means holding the hook in housed position when latched and enabling the hook to be ejected when unlatched, and a curved guide mounted on one of said half shells, said hook having a curved shank slidable in said curved guide.

5. A fish lure comprising a body portion including two half shells pivoted together adjacent their front ends, and a pair of hooks slidably mounted on one of said half shells, and biased toward ejection from between said half shells, retaining latch means released by the relative movement of said half shells, said means holding the hooks in housed position when latched and enabling the hooks to be ejected when unlatched, and two curved guides mounted on one of said half shells, said hooks having curved shanks slidable in said curved guides, respectively.

6. A fish lure comprising a body portion including two half shells pivoted together adjacent their front ends, and hook means comprising a hook slidably mounted on one of said half shells and biased toward ejection from between said half shells, and hinged retaining latch means released by the relative movement of said half shells, said means holding the hook in housed position when latched and enabling the hook to be ejected when unlatched.

7. A fish lure comprising a body portion including two half shells pivoted together adjacent their front ends, and hook means comprising an elongated hook slidably mounted on one of said half shells for longitudinal movement longitudinally of said half shells and biased toward ejection rearwardly from between said half shells, and retaining latch means released by the relative movement of said half shells, said means holding the hook in housed position when latched and enabling the hook to be ejected when unlatched.

8. A fish lure comprising a body portion including two half shells pivoted together adjacent their front ends, and hook means comprising an elongated hook slidably mounted on one of said half shells for longitudinal movement longitudinally of said half shells and biased toward ejection rearwardy from between said half shells, and retaining latch means engageable by the bend of the hook and released by the relative movement of said half shells, said means holding the hook in housed position when latched and enabling the hook to be ejected when unlatched.

MATTHEW J. HABERKORN.